United States Patent [19]
Finger

[11] 3,982,471
[45] Sept. 28, 1976

[54] SEAL IN PUMP PISTON INTERMITTENTLY PERMITTING CONDUCTION OF PUMP FLUID

[75] Inventor: John F. Finger, Beresford, S. Dak.

[73] Assignee: Sioux Steam Cleaner Corporation, Beresford, S. Dak.

[22] Filed: Dec. 18, 1974

[21] Appl. No.: 533,979

[52] U.S. Cl.................................. 92/156; 92/158; 92/168; 417/511; 277/177
[51] Int. Cl.².................... F01M 1/04; F16J 15/16
[58] Field of Search.................. 417/511, 513, 515; 92/154, 156, 158, 159, 183, 205, 86.5, 168, 182; 277/165, 173, 177

[56] References Cited
UNITED STATES PATENTS

| | | | |
|---|---|---|---|
| 1,145,733 | 7/1915 | Wright | 92/205 |
| 2,253,739 | 8/1941 | Trexler | 277/173 |
| 2,398,910 | 4/1946 | Pontius | 92/156 |
| 2,919,652 | 1/1960 | Fay | 417/520 X |
| 3,046,070 | 7/1962 | Gearhart | 92/205 X |
| 3,388,915 | 6/1968 | Dega | 277/177 |

Primary Examiner—Carlton R. Croyle
Assistant Examiner—Thomas I. Ross
Attorney, Agent, or Firm—Merchant, Gould, Smith, Edell, Welter & Schmidt

[57] ABSTRACT

An improvement in liquid pumps having a piston with a packing surface which reciprocates in contact with a cylinder, comprising means for increasing the life of the packing by transmitting thereto a small portion of the liquid being pumped, for absorption thereby to cool and lubricate the frictional interface. The structure includes a groove in the piston head and an annular member of flexible material having inherent lubricity which continuously engages the cylinder, but is smaller in cross-section than the groove so that at each reversal of the piston a tortuous passage is briefly opened past the member through the groove.

1 Claim, 3 Drawing Figures

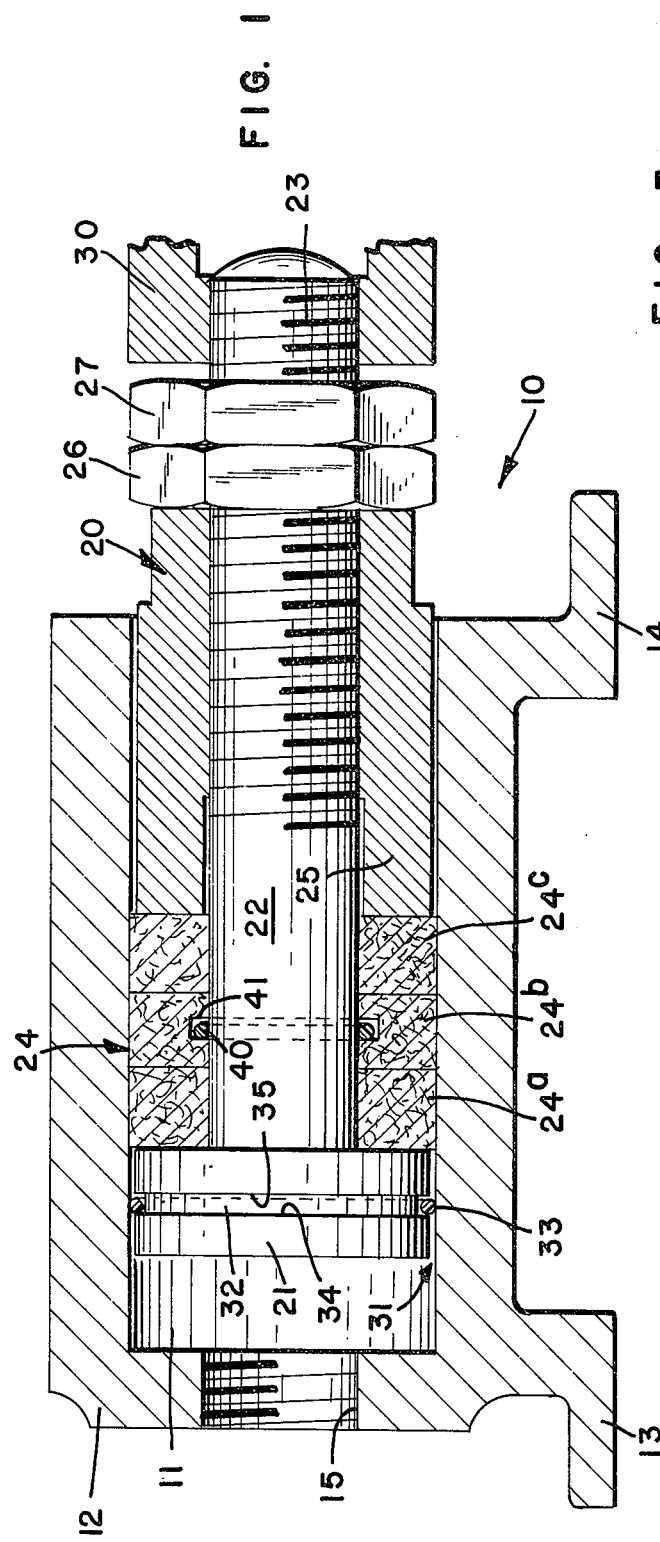
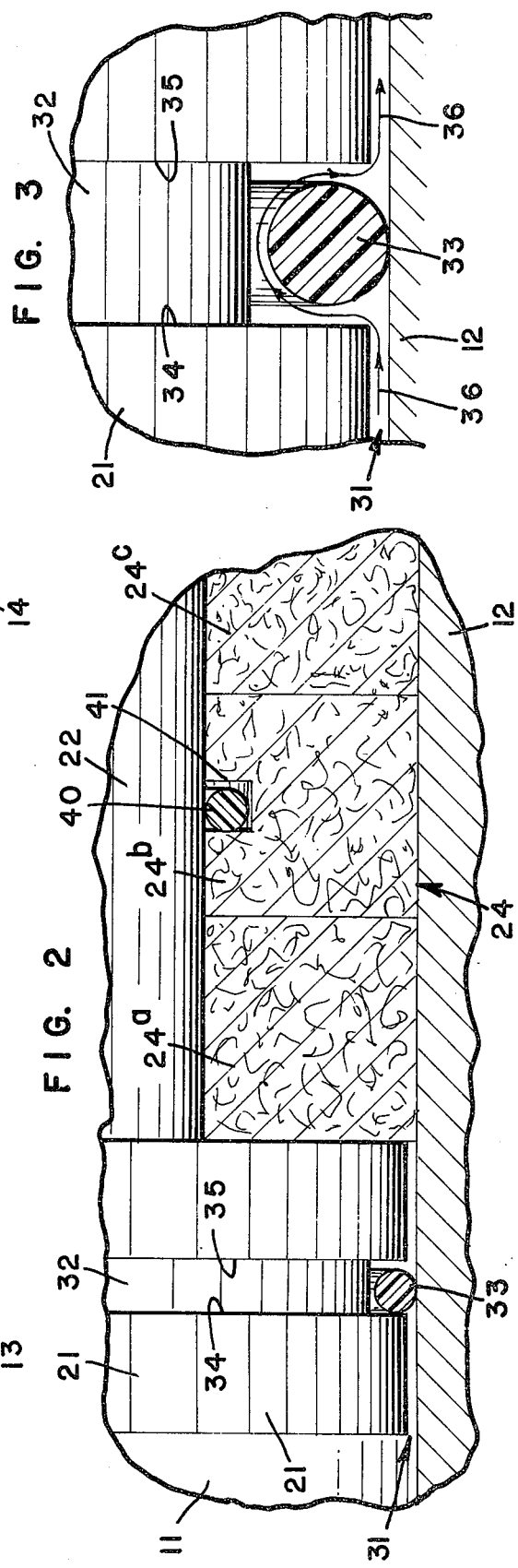

SEAL IN PUMP PISTON INTERMITTENTLY PERMITTING CONDUCTION OF PUMP FLUID

BACKGROUND OF THE INVENTION

This invention relates to the field of pumps for handling liquids, and particularly to water pumps for use with steam cleaning apparatus at locations where a supply of water under pressure is not available. For such uses, there is need for a small, heavy duty water pump which is simple in construction and adjustment and which operates for long periods without maintenance.

A pump having most of these characteristics is taught in Gearhart U.S. Pat. No. 3,046,070, which discloses a piston reciprocable in a cylinder. The piston comprises an enlarged head and a stem of reduced diameter carrying a packing which is compressed against the head and thus is forced into slidingly sealing engagement with the cylinder by means threadedly engaging the stem and fixed by jam nuts.

This structure has the imperfection that it is very difficult to adjust the compression of the packing exactly as it should be. If the packing is too tight, excessive friction between it and the cylinder results in destructive heat which burns out the packing. If the packing is too loose, leakage of water past the packing becomes significant.

SUMMARY OF THE INVENTION

The present invention avoids the imperfections described above by providing means for transmitting a very small portion of the liquid being pumped past the piston head to the packing, where it is absorbed to cool and lubricate the interface of the packing with the cylinder wall. This is accomplished by slightly reducing the diameter of the piston head, forming a groove around it, and inserting therein an annular member which only partially fills the groove, but which nevertheless fits tightly against the cylinder wall. By reason of this structure, the member seals against one wall or the other of the groove as the piston reciprocates, and only passes a small quantity of water to the packing at the instant when the piston is reversing. I prefer to also provide means for preventing passage of liquid between the piston stem and the packing.

Accordingly, it is a principal object of the invention to provide a new and improved water pump. Another object is to provide apparatus for and a method of extending the life of a pump packing by transmitting thereto a small portion of the liquid being pumped, for cooling and lubrication. Another object is to provide such apparatus including a piston head loosely received in the cylinder and having a peripheral groove, together with an annular body located in and only partially filling the groove and maintaining contact with the cylinder wall. Another object is to provide such apparatus together with means preventing the passage of the liquid being pumped past a surface of the packing which does not include the cylinder.

Various other objects, advantages, and features of novelty which characterize my invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

In the drawing FIG. 1 is a longitudinal sectional view of a pump including my invention, and FIGS. 2 and 3 are enlarged sectional views showing details.

The liquid pump 10 shown in the drawing includes a cylinder 11 formed in a housing 12 having supporting members 13 and 14. A combined inlet and outlet port 15 is provided at the end of housing 12 for connection to inlet and outlet valving means, not shown, appropriate to the pumping task.

Reciprocable in cylinder 11 is a piston 20 including an enlarged head 21, a stem 22 of reduced diameter having a threaded end 23, a packing 24 which is shown as sectional, a compression member 25, and a pair of jam nuts 26 and 27. A cross-arm 30 is threadedly connected to stem 22 for causing reciprocation of the piston within the cylinder through a desired range of travel.

The apparatus thus far described is different from that described in the Gearhart patent referred to above in that piston head 21 is not sized for a sealing fit in cylinder 11. Instead a clearance 31 is provided between cylinder 11 and head 21. A peripheral groove 32 of rectangular configuration is formed in head 21 to receive an annular member or ring 33. The width of groove 32 is greater than the thickness of member 33, both these measurements being taken parallel to the axis of piston 20, and the width of member 33 is less than the sum of the clearance 31 added to the root diameter of groove 32, both measured normal to the axis of piston 20. Annular member 33 is preferably of a flexible material within inherent lubricity such as an acrylic polymer: I have had good success with a member made of a methacrylate such as lucite. Member 33 is sized to give continuous sliding contact with cylinder 11.

By reason of the structure just described it will be appreciated that when the piston is moving to the right as shown in the drawing member 33 is drawn into sealing contact with wall 34 of groove 32, and when the piston is moving to the left, member 33 is drawn into sealing contact with wall 35 of groove 32. However, at the instant when the piston is reversing its stroke, member 33 is not in contact with either wall of the groove, and a restricted tortuous passage may be traced, as shown by the arrow 36 in FIG. 3, past the head of the piston, around member 33 through groove 32, and again past the head of the piston to packing 24. This momentary passage allows a quantity of the liquid being pumped to reach packing 24, which absorbs it and is thus cooled and lubricated: the passage is open for so brief an interval that the quantity of liquid which it passes is very small.

I have found that this arrangement has two unexpected advantages. In the first place, it reduces the wear upon and heating of the packing material, thus greatly prolonging its life. In the second place, it makes the proper adjustment of member 25 much less critical and much more permanent, so that pump maintenance becomes at the same time less frequent and less technically demanding.

There appears a certain tendency for liquid moving past the piston head, as just described, to remain in contact with the piston head, follow it to the shank, and then follow the shank out of the cylinder. While such leakage may be controlled by applying sufficient compression to packing 24, this in some measure reduces the advantages of my new construction. I prefer to provide an O-ring 40 fitting tightly over stem 22, and arranged to be received in, or form for itself, a cavity in one of the packing sections, as at 41 in section 24b.

From the foregoing it will be evident that I have invented a new and improved liquid pump in which wear and heat degradation of a sliding packing is reduced by judicious admission of a small portion of the liquid being pumped for absorption by the packing to cool and lubricate it.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In a liquid pump comprising a cylinder having inlet and outlet passage means and a piston reciprocable in said cylinder, said piston having an enlarged head of smaller diameter than said cylinder, a stem of reduced diameter, a compressible packing carried by said stem, and means carried by said stem for adjustably compressing said packing against said head for slidingly sealing engagement laterally with said cylinder, the improvement which comprises:
 a. a peripheral groove around said head,
 b. an annular member located in but only partially filling said groove, the width of said groove being greater than the thickness of said annular member and the difference between the inside diameter of said cylinder and the diameter of said piston at the bottom of said groove being greater than the difference between the inner and outer diameters of said annular member, and
 c. means preventing passage of liquid along said stem beneath said packing.

* * * * *